United States Patent Office 2,816,121
Patented Dec. 10, 1957

2,816,121
NEW PROGESTATIONAL AGENTS

David H. Gould, Leonia, Hershel L. Herzog, Mountain View, and Emanuel B. Hershberg, West Orange, N. J., assignors to Schering Corporation, Bloomfield, N. J., a corporation of New Jersey No Drawing. Application January 25, 1957, Serial No. 636,230

5 Claims. (Cl. 260—397.45)

This invention relates to a new group of steroid compounds which possess valuable therapeutic properties, and to methods for preparing same. More particularly, this invention relates to a group of 3-keto-1,4,6-androstatrienes and their 9α-fluoro analogues which possess 17α-ethinyl-17β-hydroxyl groups and either a keto or hydroxyl group at the 11-position.

The compounds of our invention may be represented by the following formula:

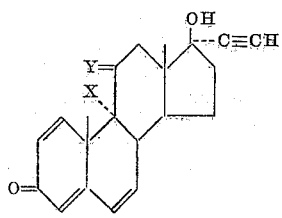

wherein X is a member of the group consisting of hydrogen and fluorine, and wherein Y is a member of the group consisting of

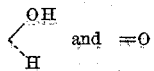

The new androstatrienes of the general formula exhibit progestational properties and are useful in the treatment of postmenopausal syndromes, infantile uterus and other menstrual disorders such as amenorrhea. Those compounds containing an α-fluoro group exhibit a higher degree of therapeutic activity than the non-halogenated analogues. All the compounds of the invention are active via oral administration.

The compounds of this invention may be prepared by a number of alternative routes. In preparing 17α-ethinyl-1,4,6-androstatriene-11β,17β-diol-3-one we prefer to employ the following sequence of reactions:

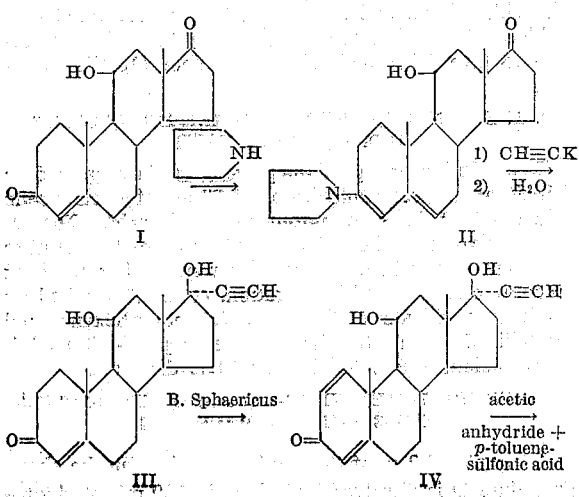

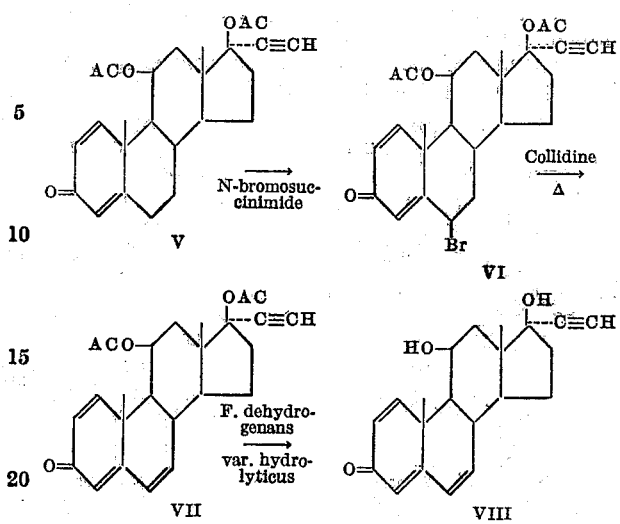

In the foregoing sequence, the 3-keto group of 4-androstene-11β-ol-3,17-dione (I) is selectively protected, such as by forming the eneamine (II) permitting ethination of the 17-keto group. Reaction of II with potassium acetylide in anhydrous ether followed by hydrolysis yields 17α-ethinyl-4-androstene-11β-diol-3-one (III). A-ring dehydrogenation transforming III to IV is conveniently effected microbiologically by means of B. sphaericus according to the analogous procedure described in co-pending application of Charney et al., Serial No. 570,210, filed March 8, 1956. The diacetate (V) is formed in the usual manner, and is brominated with an agent such as N-bromo-succinimide to form 6-bromo-17α-ethinyl-1,4 - androstadiene - 11β,17β - diol-3-one-11,17-diacetate (VI). Dehydrobromination, by refluxing with a tertiary amine such as collidine, yields the 1,4,6-androstatriene 11,17-diacetate (VII). The diacetate (VII) may be saponified chemically or, preferably, microbiologically by means of the microorganism Flavobacterium dehydrogenans var. hydrolyticum according to the analogous procedure described in co-pending application of Charney, Serial No. 458,661, filed September 27, 1954, yielding 17α - ethinyl - 1,4,6-androstatriene-11β,17β-diol-3-one (VIII).

Compound VIII may also be prepared by employing the foregoing reactions in a different sequence. For example, the protective diacetate of III may be prepared prior to halogenation and dehalogenation to form 17α-ethinyl - 4,6,androstadiene - 11β,17β - diol-3-one 11,17-diacetate. After hydrolysis of the diacetate, the Δ¹ bond may be introduced as described above, whereby there is formed 17α - ethinyl-1,4,6-androstatriene-11β,17β-diol-3-one (VIII).

The 11-keto compound, 17α-ethinyl-1,4,6-androstatriene-17β-ol-3,11-dione may be prepared by any of the following methods:

(1) Oxidation of compound VIII with chromic anhydride in pyridine.

(2) Employing the sequence of reactions from I to VIII using 4-androstene-3,11,17-trione as the starting material. In this case, in view of the stability of the 17β-hydroxyl group in the presence of a 17α-ethinyl group, it is not necessary to protectively acylate the 17β-hydroxyl group.

(3) Employing the same reactions as in method 2, but introducing the double bonds in alternate sequence as described above for VIII. It is not necessary to prepare the protective acetate of the 17β-hydroxyl compound before brominating. The 11-keto compound corresponding to III, i. e. 17α-ethinyl-4-androstene-17β-ol-3,11-dione, may first be brominated and subsequently dehydrobrominated to form the corresponding 4,6-androstadiene. This, in turn, may finally be subjected to microbiological dehydrogenation with *B. sphaericus*, for example, so as to introduce the $\Delta^1$ bond yielding 17α-ethinyl-1,4,6-androstatriene-17β-ol-3,11-dione.

Compounds of the general formula containing a 9α-fluoro group are prepared as follows:

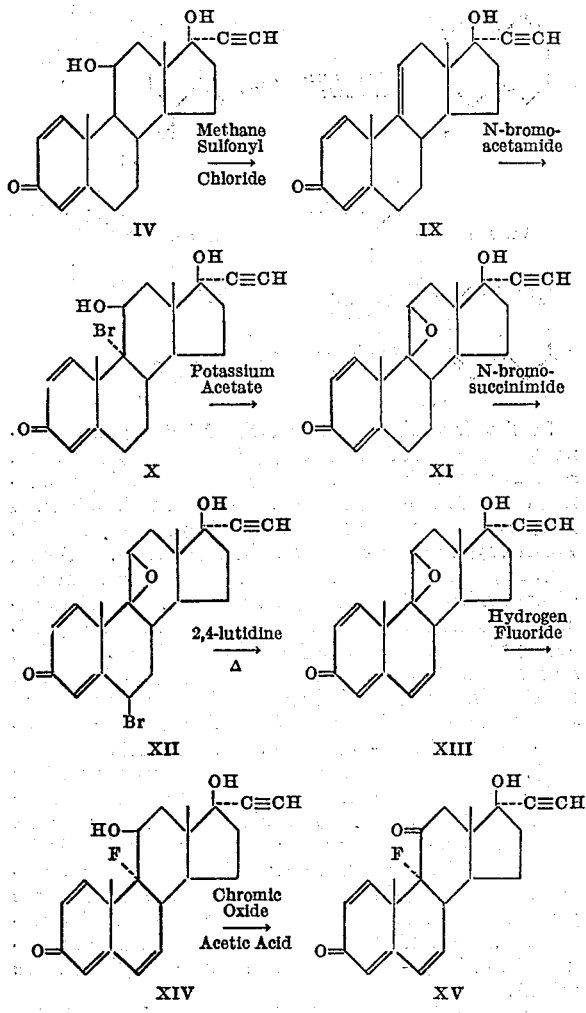

17α - ethinyl - 1,4-androstadiene - 11β,17β - diol - 3-one (IV) is converted to 1,4,9(11)-androstatriene (IX) by dehydration of the 11-hydroxyl with an agent such as methane sulfonyl chloride. IX is then hydroxy-brominated with N-bromoacetamide or N-bromosuccinimide to yield the 9α-bromo-11β-hydroxy-diene (X). Dehydrobromination with a base such as potassium acetate follows to form the 9β,11β-epoxy compound (XI). Bromination at C-6 (compound XII) is effected through the use of an agent such as N-bromosuccinimide, followed by dehydrobromination by refluxing in a tertiary base such as lutidine to obtain 17α-ethinyl-9β,11β-epoxy-1,4,6-androstatriene-17β-ol (XIII). The addition of hydrogen fluoride effects transformation to 9α-fluoro-17α-ethinyl-1,4,6-androstatriene-11β,17β-diol-3-one (XIV). When XIV is oxidized in a conventional manner with chromic anhydride in acetic acid, the corresponding 11-keto compound of this invention (XV) is obtained.

The intermediate IX, is alternatively prepared by reacting 17α-ethinyl-4-androstene-11β,17β-diol-3-one (III) with an agent such as methane sulfonyl chloride to form 17α - ethinyl-4,9(11)-androstadiene-17β-ol-3-one, which may then be subjected to the action of *B. sphaericus* to obtain 17α-ethinyl-1,4,9(11)-androstatriene-17β-ol-3-one (IX).

The foregoing is more fully described in the following examples which are not to be construed as limiting the scope of the invention, but are given for illustrative purposes only.

EXAMPLE 1

*17-Ethinyl-1,4,6-Androstatriene-11β,17β-diol-3-one*

A. 3-PYRROLIDINO-3,5-ANDROSTADIENE-11β-OL-17-ONE

A sample of 5 g. of 4-androstene-11β-ol-3,17-dione is suspended in 20 ml. of methanol and nitrogen is passed through to displace air. The mixture is heated to reflux and methanol is added dropwise to complete solution. To the boiling solution is added 1.8 g. of pyrrolidine and the solution is boiled until crystals appear (about 5 min.). The mixture is chilled and filtered, and the solid 3-pyrrolidino-3,5-androstadiene-11β-ol-17-one is washed with cold methanol and dried in vacuo.

B. 17-ETHINYL-4-ANDROSTENE-11β,17β-DIOL-3-ONE

A sample of 260 mg. of potassium is dissolved in 25 ml. of boiling redistilled t-amyl alcohol. This solution is added dropwise with stirring at room temperature to a solution of 150 ml. of anhydrous ether saturated with acetylene. After five minutes of stirring, a solution in 150 ml. anhydrous ether of 2 g. of the product of Example 1, Procedure A is added dropwise over 1 hour while acetylene is bubbled through the stirred mixture. Bubbling and stirring is continued for 2 hours more. Dilute acetic acid containing 0.5 g. of sodium acetate is added cautiously. The mixture is boiled 20 minutes and then extracted with ether. The ether solution is washed neutral with sodium bicarbonate solution and water, dried and evaporated. The residue is crystallized from acetone-methanol to give 17-ethinyl-4-androstene-11β,17β-diol-3-one.

C. 17-ETHINYL-1,4-ANDROSTADIENE-11β,17β-DIOL-3-ONE

*Bacillus sphaericus* var. *fusiformis* (A. T. C. C. 7055) is incubated on nutrient agar for 24 hours at 28° C. One loopful of the culture is then transferred to 100 ml. of sterile 1% yeast extract (Basamin-Busch) of pH 6.8. The inoculated culture is incubated on a shaking machine for 6 hours at 28° C. and the resultant broth culture is used as a standard inoculum at a level of 1 percent.

The standard inoculum is added to each of ten 300 ml. shake flasks containing respectively 100 ml. of 1% yeast extract at pH 6.8. Growth of the organism is followed turbidimetrically and 17-ethinyl - 4 - androstene-11β,17β-diol-3-one prepared as above (50 mg. in 1 ml. of methanol/flask) is added at the peak of the growth curve. The transformation proceeds rapidly and is followed adequately by paper chromatography or polarography of aliquots from the shake flasks. When the substrate is completely transformed (12–24 hours), the contents of the remaining flasks are pooled, extracted exhaustively with chloroform, and the extracts are concentrated to a residue. The residual material is recrystallized from acetone to give 17-ethinyl-1,4-androstadiene-11β,17β-diol-3-one.

D. 17-ETHINYL-1,4-ANDROSTADIENE-11β,17β-DIOL-3-ONE 11,17-DIACETATE

To a solution of 5 g. of the product of above procedure C in 50 ml. of acetic anhydride and 50 ml. of glacial acetic acid is added 0.5 g. of p-toluenesulfonic acid. The reaction mixture is allowed to stand at room temperature overnight and is then treated with water. The resulting precipitate is removed by filtration, chromatographed on magnesium silicate eluting with 1:1 ether-hexane, and crystallized from ether-hexane yielding 17-ethinyl-1,4-androstadiene-11β,17β-diol-3-one 11,17-diacetate.

E. 6-BROMO-17-ETHINYL-1,4-ANDROSTADIENE-11β,17β-DIOL-3-ONE 11,17-DIACETATE

A sample of 2 g. of the product obtained in the above procedure D is dissolved by boiling in 100 ml. of chlorobenzene and 50 ml. of carbon tetrachloride and the solution is dried by distilling off 5 ml. of solvent. To the solution is added 1.88 g. of N-bromosuccinimide and the mixture is irradiated with a 200-watt photoflood lamp while refluxing for 15 minutes while succinimide crystallizes out. The mixture is cooled and washed with water, and the organic solution is dried, filtered and evaporated in vacuo to a residue which is 6-bromo-17-ethinyl-1,4-androstadiene-11β,17β-diol-3-one 11,17-diacetate.

F. 17-ETHINYL-1,4,6-ANDROSTATRIENE-11β,17β-DIOL-3-ONE 11,17-DIACETATE

To 15 ml. of refluxing dry γ-collindine is added 0.5 g. of the product of procedure E. After 30 minutes boiling during which solid precipitates, the mixture is cooled, poured into ice and water and the pH adjusted to 4–6 with dilute hydrochloric acid. The mixture is extracted three times with 25 ml. of methylene chloride, and the solution is washed with water, dried, filtered and evaporated to dryness. The residue is dissolved in a minimum of methylene chloride and chromatographed on activated magnesium silicate using hexane to develop the column. The fraction eluted with ether is the 17-ethinyl-1,4,6-androstatriene-11β,17β-diol-3-one 11,17-diacetate, which may be crystallized further from acetone-hexane.

G. 17-ETHINYL-1,4,6-ANDROSTATRIENE-11β,17β-DIOL-3-ONE

A mixture is prepared of 1 g. of yeast extract concentrate and 1 ml. each of 2 M. potassium dihydrogen phosphate and 2 M. disodium phosphate in each 100 ml. Ten Erlenmeyer flasks (300 ml.) containing 100 ml. each are sterilized and inoculated with *Flavobacterium dehydrogenans* var. *hydrolyticum*. The flasks are shaken at 30° C. for 16 hours, and to each is added a solution of 50 mg. of the 11,17-diacetate of 17-ethinyl-1,4,6-androstatriene-11β,17β-diol-3-one in 5 ml. of methanol. The cultures are shaken at 30° C. for 24 hours and the combined broths are extracted three times with 300 ml. of methylene chloride and the extract is dried, filtered and evaporated to dryness. The residue is crystallized from acetone-hexane to give 17-ethinyl-1,4,6-androstatriene-11β,17β-diol-3-one.

Alternatively, the compound of this example may be prepared using the same reactions outlined above, but in a different sequence. In the alternate method, the compound of procedure B (17-ethinyl-4-androstene-11β,17β-diol-3-one) is acetylated with acetic anhydride to give the corresponding 11,17-diacetate. This, in turn, is reacted with N-bromosuccinimide to obtain the 6-bromo-4-androstene. Dehydrobromination of this compound is effected by refluxing with a tertiary base such as collidine to yield 17-ethinyl-4,6-androstadiene-11β,17β-diol-3-one 11,17-diacetate. This 11,17-diacetate is hydrolyzed to the corresponding 11,17-diol when treated with *Flavobacterium dehydrogens* var. *hydrolyticum*. The resulting diol is then subjected to the action of *Bacillus sphaericus* var. *fusiformis* to obtain the desired compound 17-ethinyl-1,4,6-androstatriene-11β,17β-diol-3-one.

EXAMPLE 2

*17-ethinyl-1,4,6-androstatriene-17β-ol-3,11-dione*

Two grams of the product of Example 1 is dissolved in 20 ml. of pyridine and added with stirring to a cooled slurry of 1 g. of chromic anhydride in 20 ml. of pyridine. The mixture is stirred overnight at room temperature, and then diluted with 40 ml. of 10% aqueous sodium sulfite, followed by stirring for 2 hours. The mixture is acidified with aqueous sulfuric acid and extracted with methylene chloride. This solution is washed neutral with water, dried, filtered and evaporated to a residue. The product, 17-ethinyl-1,4,6-androstatriene-17β-ol-3,11-diol, is obtained by crystallization of the residue from acetone-hexane.

Alternatively, the compound of this example may be prepared via the following series of reactions:

A. 3-PYRROLIDINO-3,5-ANDROSTADIENE-3,11,17-TRIONE 4-androstene-3,11,17-trione is reacted in the manner described in Example 1, procedure A to yield 3-pyrrolidino-3,5-androstadiene-11,17-dione.

B. 17-ETHINYL-4-ANDROSTENE-17β-OL-3,11-DIONE

The pyrrolidino-androstadiene prepared above is reacted with acetylene under the conditions outlined in Example 1, procedure B. Crystallization of the residue from acetone-methanol gives 17-ethinyl - 4 - androstene-17β-ol-3,11-dione.

C. 17-ETHINYL-1,4-ANDROSTADIENE-17β-OL-3,11-DIONE

The product of the above procedure B is subjected to the action of *Bacillus sphaericus* var. *fusiformis* as described in Example 1, procedure C. The residual material is recrystallized from acetone to give 17-ethinyl-1,4-androstadiene-17β-ol-3,11-dione.

D. 6-BROMO-17-ETHINYL-1,4-ANDROSTADIENE-17β-OL-3,11-DIONE 2 grams of 17-ethinyl-1,4-androstadiene-17β-ol-3,11-dione is brominated with 1.15 grams of N-bromosuccinimide in the manner described in Example 1, procedure E. The resulting residue is 6-bromo-17-ethinyl-1,4-androstadiene-17β-ol-3,11-dione with an ultraviolet spectrum having λ max=245 mμ.

E. 17-ETHINYL-1,4,6-ANDROSTATRIENE-17β-OL-3,11-DIONE

A sample of 2 grams of the 6-bromo-1,4-androstadiene compound prepared above is refluxed with γ-collidine and purified in the manner described in Example 1, procedure F. The fraction eluted with ether is the desired 17-ethinyl-1,4,6-androstatriene-17β-ol-3,11-dione which may be crystallized further from acetone-hexane. The ultraviolet spectrum has λ max= 223, 255, 297 mμ.

The sequence of the reactions in the synthesis of the compound of this example is not critical. Thus, we may alternatively prepare this compound by reacting 17 - ethinyl-4-androstene-17β-ol-3,11-dione (product of procedure B in Example 2) with N-bromosuccinimide to obtain 6-bromo-17-ethinyl-4-androstene-17β-ol-3,11-dione. This, in turn, when refluxed with a tertiary amine such as γ-collidine yields 17-ethinyl-4,6-androstadiene-17β-ol-3,11-dione. The action of *Bacillus sphaericus* var. *fusiformis* then converts this androstadiene to the desired compound, 17-ethinyl - 1,4,6 - androstatriene-17β-ol-3,11-dione.

EXAMPLE 3

*9α-fluoro-17-ethinyl - 1,4,6 - androstatriene-11β,17β-diol-3-one*

A. 17-ETHINYL-1,4,9(11)-ANDROSTATRIENE-17β-OL-3-ONE

A sample of 5 grams of 17-ethinyl-1,4-androstadiene-11β,17β-diol-3-one (product of procedure C, Example 1) is dissolved in 20 ml. of dimethylformamide and 4 ml. of dry pyridine. The solution is chilled and stirred, and 4.1 g. of methane sulfonyl chloride in 41 ml. of dimethylformamide is added.

After being stirred at room temperature for 20 hours, the mixture is poured into 200 ml. of water, and extracted twice with 100 ml. of methylene chloride. The organic layer is washed with 10% sodium bicarbonate and with water, dried and evaporated. The residue is crystallized from aqueous acetone to give 17-ethinyl-1,4,9(11)-androstatriene-17β-ol-3-one.

B. 9α-BROMO-17-ETHINYL-1,4-ANDROSTADIENE-11β,17β-DIOL-3-ONE

A sample of 2.5 g. of the product of above procedure A is dissolved in 250 ml. of dry tetrahydrofuran and 25 ml. of water. The solution is chilled with stirring to 5°

C. and 2.5 g. of N-bromoacetamide is added. After the addition of 25 ml. of 1 N perchloric acid, the mixture is allowed to stand at room temperature for 48 hours.

The solution is diluted with 10% sodium sulfite and water and extracted with 200 ml. of chloroform twice. The extract is washed with water, dried and evaporated giving a residue which is dissolved in acetone, treated with charcoal, filtered and diluted with hexane. The product, 9α-bromo-17-ethinyl-1,4-androstadiene-11β,17β-diol-3-one, is recrystallized from acetonehexane.

C. 17-ETHINYL-9β,11β-OXIDO-1,4-ANDROSTADIENE-17β-OL-3-ONE

A sample of 2 g. of the 9α-bromo product of above procedure B is dissolved in 200 ml. of acetone and 4 g. of potassium acetate is added. The solution is refluxed for 24 hours and evaporated to a residue in vacuo. Crystallization from acetone-hexane gives the desired epoxide, 17-ethinyl-9β,11β-oxido-1,4-androstadiene-17β-ol-3-one.

D. 6-BROMO-17-ETHINYL-9β,11β-OXIDO-1,4-ANDROSTADIENE-17β-OL-3-ONE

A sample of 2 g. of the epoxide of above procedure C is dissolved by boiling in 100 ml. of chlorobenzene and 50 ml. of carbon tetrachloride, and the solution is dried by distilling off 5 ml. of solvent. To the solution is added 1.19 g. of N-bromosuccinimide and the mixture is irradiated with a 200-watt photoflood lamp and refluxed for 15 minutes while succinimide crystallizes out. The mixture is cooled, filtered, and the filtrate washed with water. The organic solution is dried over sodium sulfate, filtered, and evaporated in vacuo to a residue of 6-bromo-17 - ethinyl-9β,11β-oxido-1,4-androstadiene-17β-ol-3-one.

E. 17-ETHINYL-9β,11β-OXIDO-1,4,6-ANDROSTATRIENE-17β-OL-3-ONE

To 30 ml. of refluxing dry 2,4-lutidine is added 1.0 g. of 6-bromo-17-ethinyl-9β,11β-oxido-1,4-androstadiene-17β-ol-3-one. After 30 minutes boiling during which solid precipitates, the mixture is cooled, poured into ice and water, and the pH adjusted to 4–6 with dilute hydrochloric acid. The mixture is extracted three times with 25 ml. of methylene chloride, and the solution is washed with water, dried, filtered and evaporated to dryness.

The residue is dissolved in a minimum of methylene chloride and chromatographed on activated magnesium silicate using haxane to develop the column. The fraction eluted with ether is 17-ethinyl-9β,11β-oxido-1,4,6-androstatriene-17β-ol-3-one which may be crystallized further from acetone-hexane.

F. 9α-FLUORO-17-ETHINYL-1,4,6-ANDROSTATRIENE-11β,17β-DIOL-3-ONE

A sample of 1 g. of the product of above procedure E is dissolved in 100 ml. of anhydrous, alcohol-free chloroform and chilled to −60° in a Dry Ice-acetone bath. The stirred solution is treated with 1 g. of anhydrous hydrogen fluoride for 15 hrs. when the solution is washed with sodium bicarbonate solution, dried, filtered and evaporated. The residue is chromatographed on activated magnesium silicate and the fraction eluted with ether is crystallized from acetone-hexane to give 9α-fluoro-17-ethinyl-1,4,6-androstatriene-11β,17β-diol-3-one.

In the same manner, use of hydrogen chloride and hydrogen bromide in place of hydrogen fluoride, leads to 9α-chloro- and 9α-bromo-17-ethinyl-1,4,6-androstatriene-11β,17β-diol-3-one respectively.

EXAMPLE 4

9α-fluoro-17-ethinyl - 1,4,6 - androstatriene-17β-ol-3,11-dione

A sample of 0.5 g. of 9α-fluoro-17-ethinyl-1,4,6-androstatriene-11β,17β-diol-3-one is dissolved in 15 ml. of acetic acid, stirred and treated with a solution of 95 mg. of chromic anhydride in 0.5 cc. of water to which 1.0 cc. of acetic acid is added. The solution is stirred 15 minutes, treated with methanol, stirred 30 minutes and poured into water. The precipitate is collected, dried and recrystallized from acetone-hexane to give 9α-fluoro-17-ethinyl-1,4,6-androstatriene-17β-ol-3,11-dione.

We claim:
1. Unsaturated steroids having the following formula:

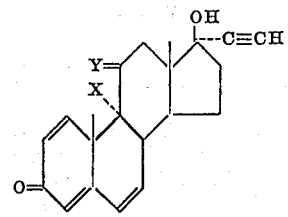

wherein X is a member of the group consisting of hydrogen and fluorine; and Y is a member of the group consisting of

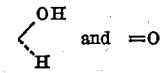

2. 17 - ethinyl - 1,4,6-androstatriene - 11β,17β - diol - 3 - one.

3. 17-ethinyl-1,4,6-androstatriene-17β-ol-3,11-dione.

4. 9α-fluoro-17-ethinyl - 1,4,6 - androstatriene-11β,17β-diol-3-one.

5. 9α-fluoro - 17 - ethinyl - 1,4,6-androstatriene-17β-ol-3,11-dione.

No references cited.